US008576725B2

(12) United States Patent
Chavez et al.

(10) Patent No.: US 8,576,725 B2
(45) Date of Patent: Nov. 5, 2013

(54) FAILOVER BASED ON SENDING COMMUNICATIONS BETWEEN DIFFERENT DOMAINS

(75) Inventors: David L. Chavez, Broomfield, CO (US); Gregory D. Weber, Westminster, CO (US)

(73) Assignee: Avaya Inc., Basking Ridge, NJ (US)

(*) Notice: Subject to any disclaimer, the term of this patent is extended or adjusted under 35 U.S.C. 154(b) by 452 days.

(21) Appl. No.: 12/856,057

(22) Filed: Aug. 13, 2010

(65) Prior Publication Data

US 2012/0042199 A1 Feb. 16, 2012

(51) Int. Cl.
*G01R 31/08* (2006.01)

(52) U.S. Cl.
USPC ........... 370/241; 370/225; 370/356; 714/4.21

(58) Field of Classification Search
None
See application file for complete search history.

(56) References Cited

U.S. PATENT DOCUMENTS

| | | | |
|---|---|---|---|
| 6,141,319 A | 10/2000 | Dighe et al. | |
| 6,311,288 B1* | 10/2001 | Heeren et al. | 714/4.2 |
| 6,542,934 B1* | 4/2003 | Bader et al. | 709/239 |
| 7,366,101 B1 | 4/2008 | Varier et al. | |
| 2005/0153725 A1 | 7/2005 | Naghian et al. | |
| 2006/0250946 A1 | 11/2006 | Croak et al. | |
| 2007/0076727 A1* | 4/2007 | Shei | 370/401 |
| 2008/0031130 A1 | 2/2008 | Raj et al. | |
| 2008/0317011 A1 | 12/2008 | Datta et al. | |
| 2009/0168642 A1* | 7/2009 | Shibata | 370/218 |
| 2009/0222582 A1 | 9/2009 | Josefsberg et al. | |
| 2010/0150160 A1* | 6/2010 | Kinsky et al. | 370/395.53 |
| 2011/0141879 A1 | 6/2011 | Ballard | |

FOREIGN PATENT DOCUMENTS

| | | |
|---|---|---|
| EP | 2048819 | 4/2009 |
| GB | 2455075 | 6/2009 |
| WO | 2008141961 A1 | 11/2008 |

OTHER PUBLICATIONS

U.S. Appl. No. 12/791,662, filed Jun. 1, 2010, entitled "Switching Communications Between Different Networks Based on Device Capabilities," 31 pages.

* cited by examiner

*Primary Examiner* — David Oveissi

(57) ABSTRACT

A first communication device detects a failure on a communication channel of a primary network. Based on the failure, the first communication device sends communications directed to a second communication device to a secondary network. A secondary network domain controller sends the communications to the primary network via a different communication channel. This can be done by looking at an identifier such as an IP address. This can also happen based on being able to communicate between the secondary network and the primary network via the different communication channel. The primary network then sends the communication to the second communication device. In addition, communications from the second communication device are routed in a similar manner to the first communication device. Sending the communications back into the primary network allows users to have access to features not provided by the secondary network.

22 Claims, 6 Drawing Sheets

FAILOVER BASED ON SENDING COMMUNICATIONS BETWEEN DIFFERENT DOMAINS

TECHNICAL FIELD

The system and method relates to failover systems, and in particular to failover systems that route communications between different networks.

BACKGROUND

There are a variety of systems that have been developed to deal with conditions where a network or communication channel to a network fail. For example, there are systems that failover to a Time Division Multiplexing (TDM) network when a packet switch network fails or vice versa. These solutions tend to be network centric and have been developed for larger customers where the costs for failover systems and the costs for full service failover networks are not as cost prohibitive. To implement these network centric solutions, customers have to purchase additional hardware such as gateways/controllers that provide alternate routing to a second network when there is a condition requiring failover. In addition, the costs for having the second full service network to failover tends to be expensive. For small to mid-size customers, having to pay the additional expense of new hardware is too cost prohibitive.

Other solutions have attempted to solve this problem by having a device such as a Session Initiation Protocol (SIP) device failover to a second network when a communication channel to the core network fails or has Quality of Service problems. To keep costs down, the second network typically has been a network that provides simple communication services, such as in some of the current peer-to-peer communication networks. These solutions eliminate the cost of having to buy additional hardware. However, customers want options that allow them to have the same capabilities that they currently have when access to their core network fails, without having to pay the excessive costs associated with additional hardware and expensive failover networks. What is needed is a cost effective failover solution that does not require network gateways/controllers and provides the same capabilities that customers currently get from their core network.

SUMMARY

The system and method are directed to solving these and other problems and disadvantages of the prior art. A first communication device detects a failure on a communication channel of a primary network. Based on the failure, the first communication device sends communications directed to a second communication device to a secondary network. A secondary network domain controller sends the communications to the primary network via a different communication channel. The primary network then sends the communication to the second communication device. In addition, communications from the second communication device are routed in a similar manner to the first communication device. Using the secondary network purely for routing provides the users their native feature set from the primary network.

In a second embodiment, the primary network is a network centric network provided by a first service provider and the secondary network is a peer-to-peer network provided by a second service provider.

Another embodiment allows for the second network to provide services for the communication device in the event that the second network cannot communicate with the first network.

Another embodiment includes a process of arbitrating a master node at a location. The master node is used to send communications from other communication nodes and communications from the master node to the secondary network.

BRIEF DESCRIPTION OF THE DRAWINGS

These and other features and advantages of the system and method will become more apparent from considering the following description of an illustrative embodiment of the system and method together with the drawings, in which.

DETAILED DESCRIPTION

Some embodiments will be illustrated below in conjunction with an exemplary communication system. Although well suited for use with, e.g., a system using router(s), server(s), networks, database(s), and/or communications devices, etc, the embodiments are not limited to use with any particular type of communication system or configuration of system elements. Those skilled in the art will recognize that the disclosed techniques may be used in any communication system in which it is desirable to provide enhanced failover capabilities.

Figure 1:
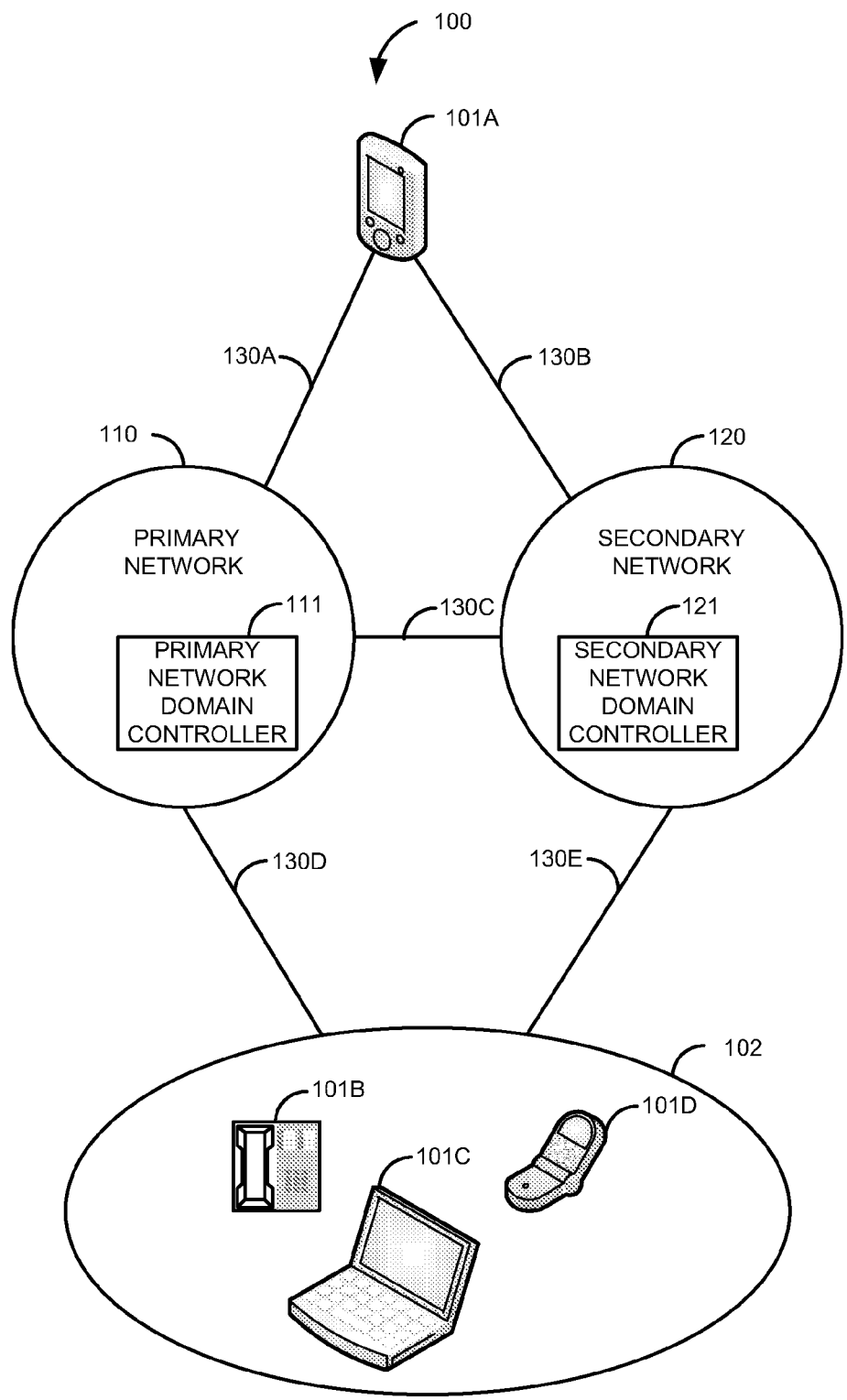
FIG. 1 is a block diagram of a first illustrative system for detecting a failure on a communication channel of a primary network and sending communications back to the primary network via a secondary network.

FIG. 1 is a block diagram of a first illustrative system 100 for detecting a failure on a communication channel 130 of a primary network 110 and sending communications back to primary network 110 via a secondary network 120. The first illustrative system 100 comprises communication devices 101A-101D, a primary network 110, a secondary network 120, and communication channels 130A-130E.

Communication devices 101A-101D can be any type of communication device such as a telephone, a cellular telephone, a personal computer (e.g., running a softphone), a Personal Digital Assistant (PDA), a notepad computer, and the like. In FIG. 1, four communication devices 101 are shown for illustrative purposes; however, only two communication devices 101 are necessary to send a communication between communication devices 101. Communication devices 101B-101D are shown as part of a group of communication devices 101 at location 102. Location 102 can be, for example, a branch location of a company, a second building in a campus, and the like. Communication device 101A is shown as a single communication device; however, communication device 101A could be part of a group of communications devices like shown in location 102. Communication device 101A can be a communication device at a first company and communication devices 101B-101D can be at location 102 of a second company or the first company.

Communication channels 130A-130E are used to connect communication devices 101, primary network 110, and secondary network 120 together. Communication channels 130A-130E can be any type of communication channel such as a wireless channel, a wired channel, a fiber-optic channel, and the like. Communication channels 130A-130E can include switching and routing equipment such as routers, switches, Private Branch Exchanges (PBXs), central office switches, hubs, and the like. Communication channels 130A-130E can comprise packet switched communication equipment, Time Division Multiplexed (TDM) equipment, parts of networks (such as the Internet or the Public Switched Telephone Network (PSTN)), and the like.

Primary network 110 is typically network centric and provides enhanced network centric services such as teleconferencing, video conferencing, call forwarding, voicemail, and the like. For example, primary network 110 can be the Public Switched Telephone Network (PSTN), a private wide area network, a service provider network (such as those provided by service providers such as AT&T, Sprint, etc.), and the like. Primary network 110 comprises a primary network domain controller 111.

Primary network domain controller 111 can be a variety of devices such as a switch, a router, a hub, and the like. Primary network domain controller 111 can comprise one or more devices. Among other things, primary network domain controller 111 can route communications to secondary network 120 based on one or more failures on a communication channel(s) 130. Primary network domain controller 111 can also route/send communications originating from secondary network 120. Primary network domain controller 111 can route/send the communication based on an administered communication device identifier such as an Internet Protocol (IP) address, a device hardware address, or any address/identifier that identifies a communication device 101 or group of communication devices 101, and the like.

Secondary network 120 is typically peer-to-peer and provides limited communications services such as basic call routing and connection services. For example, secondary network 120 can be a peer-to-peer network such as Skype™. Secondary network 120 comprises a secondary network domain controller 121.

Secondary network domain controller 121 can be a variety of devices such as a switch, a router, a hub, and the like. Secondary network domain controller 121 can comprise one or more devices. Secondary network domain controller 121 is used to route communications to primary network 110. Secondary network domain controller 121 can route the communication based on an administered communication device identifier such as an Internet Protocol (IP) address, a device hardware address, or any address that identifies a communication device 101 or group of communication devices 101, and the like.

Primary network 110 and secondary network 120 can be different types of networks or similar networks. Primary network 110 and secondary network 120 are shown with a domain controller (111 and 121) that is used to route/send communications. As one of ordinary skill in the art would recognize, primary network 110 and secondary network 120 can comprise many other elements that can route/send communications such as switches, hubs, routers, and the like. In one embodiment, primary network 110 is provided by one service provider and secondary network 120 is provided by a different service provider.

Under normal conditions, communication devices 101B-101D communicate to communication device 101A through primary network 110. A failure occurs on communication channel 130D. One of communication devices 101B-101D detects a failure on communication channel 130D. In this example, communication device 101B detects a failure on communication channel 130D. Communication device 101B can detect a failure on communication channel 130D in various ways, such as sending a communication to primary network 110 and not receiving a response. For example, communication device 101B can send a SIP INVITE (or multiple SIP INVITES) and determine that communication channel 130D has failed by not receiving a response to the SIP INVITE.

Upon detecting that communication channel 130D has failed, communication device 101B sends a communication directed to communication device 101A; based on the failure, the communication is sent to secondary network 120 via communication channel 130E. A communication can be any type of communication, such as a voice communication, a video communication, an email communication, a packet, a series of packets, and the like. A communication can be based on a connection oriented protocol, a connectionless oriented protocol, a datagram protocol, a Time Division Multiplexed protocol, and the like. In this example, communication channels 130D and 130E are shown as separate communication channels coming from location 102. However, in some embodiments, a single communication channel (not shown) from location 102 to a network such as the Internet can be used; in this instance, communication channels 130D and 130E would access the Internet to go into their respective networks (110 and 120).

Upon receiving the communication from 101B, the secondary domain controller 121 sends the communication to primary network 110 via communication channel 130C. This can be done based on an identifier of communication device 101B, such as an IP address, a device address, a telephone number, an email address, or any address that can identify, or is associated with, communication device 101B or a user of communication device 101B.

One of the advantages of sending the communication back into primary network 110 by secondary network domain controller 121 is that the user can now have access to features that are offered by primary network 110 that are not offered by secondary network 120. For example, if secondary network 120 is a peer-to-peer network with limited services, by routing signaling packets back to primary network 110, the user can have access to their native services, such as voicemail, conferencing, and other advanced services not offered on secondary network 120.

Secondary network domain controller 121 can route the communication in various ways. For example, secondary network domain controller 121 can process the communication at different layers in a layered protocol such as one that conforms to the Open Systems Interconnect (OSI) 7 layer model. For instance, secondary network domain controller 121 can process the communication up to the network layer (layer 3) or process the communication all the way to the application layer (layer 7). This would optionally include native service support for user 101B in the case that secondary network domain controller 121 cannot access the primary network 110 via link 130C.

Primary network domain controller 111 receives the communication from secondary network domain controller 121. Primary network domain controller 111 sends the communication to communication device 101A via communication channel 130A. Communication device 101A receives the communication. Communication device 101A can now process the communication.

Likewise, the process of routing a communication also works in the opposite direction. For example, assume that communication device 101A also uses primary network 110 and secondary network 120 in like manner. Also, assume communication channel 130D fails and communication device 101A wants to send a communication to communication device 101B.

Primary network domain controller 111 detects a failure on communication channel 130D. This can be done in a similar manner as described previously. Communication device 101A sends a communication directed to communication device 101B to primary network 110 via communication channel 130A. Primary network domain controller 111 sends the communication to secondary network 120 via communication channel 130C. Secondary network domain controller 121 sends the communication to communication device 101B via communication channel 130E. Communication device 101B then receives the communication.

Figure 2:
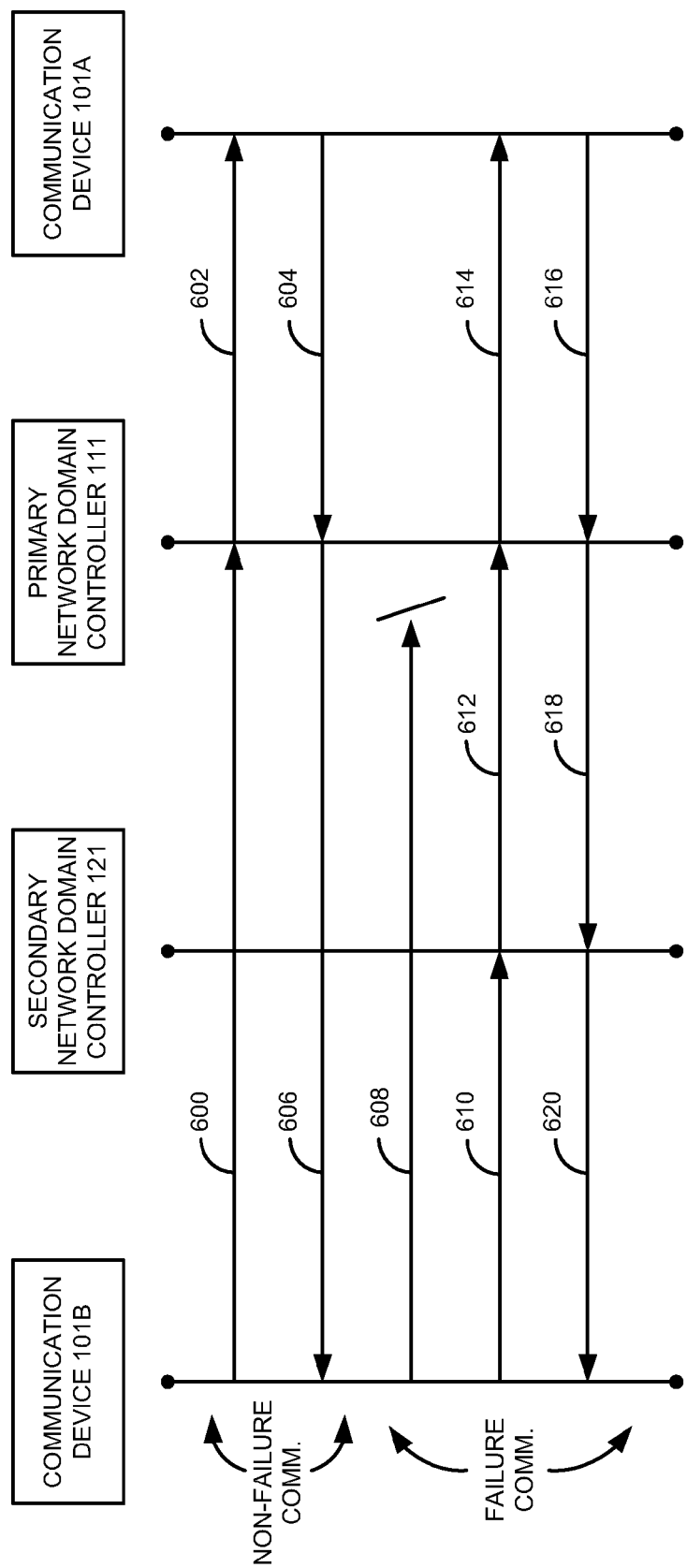
FIG. 2 is a flow diagram for detecting a failure on a communication channel of a primary network and sending communications back to the primary network via a secondary network.

FIG. 2 is a flow diagram for detecting a failure on a communication channel 130 of a primary network 110 and sending communications back to primary network 110 via a secondary network 120. Illustratively, communication devices 101A-101D, primary network domain controller 111, and secondary network domain controller 121 are stored-program-controlled entities, such as a computer or processor, which performs the method of FIGS. 2-6 and the processes described herein by executing program instructions stored in a computer readable storage medium, such as a memory or disk. In describing FIGS. 2-6, the previously described process of sending a communication between communication device 101A and communication device 101B will be used as an example; however, the processes of FIGS. 2-6 can be used for communications between two or more communication devices 101.

Under normal conditions where communication channel 130D is operating correctly, communication device 101B sends a first communication to primary network 110, which is directed to communication device 101A via communication channel 130D in step 600. Primary network domain controller 111 receives the first communication and sends the first communication to communication device 101A in step 602.

Communication device 101A sends a second communication (e.g., a response to the first communication) to primary network 110, which is directed to communication device 101B via communication channel 130A in step 604. Primary network domain controller 111 receives the second communication and sends the second communication to communication device 101B in step 606.

Upon a failure in communication channel 130D, communication device 101B sends a first communication to primary network 110 on communication channel 130D in step 608. Since communication channel 130D has failed, communication device 101B detects a failure on communication channel 130D (e.g., by not receiving a response to the first communication). Communication device 101B then sends the first communication to secondary network 120 via communication channel 130E in step 610. Secondary network domain controller 121 receives the first communication and sends the first communication to primary network 110 via communication channel 130C in step 612. Primary network domain controller 111 receives the communication and sends the communication to communication device 101A in step 614.

Communication device 101A sends a second communication to primary network 110, which is directed to communication device 101B via communication channel 130A in step 616. Primary network domain controller 111 receives the second communication. Primary network domain controller 111 has also detected the failure of communication channel 130D and sends the second communication to secondary network 120 via communication channel 130C in step 618. Secondary network domain controller 121 receives the second communication and sends the second communication to communication device 101B in step 620.

Figure 3:
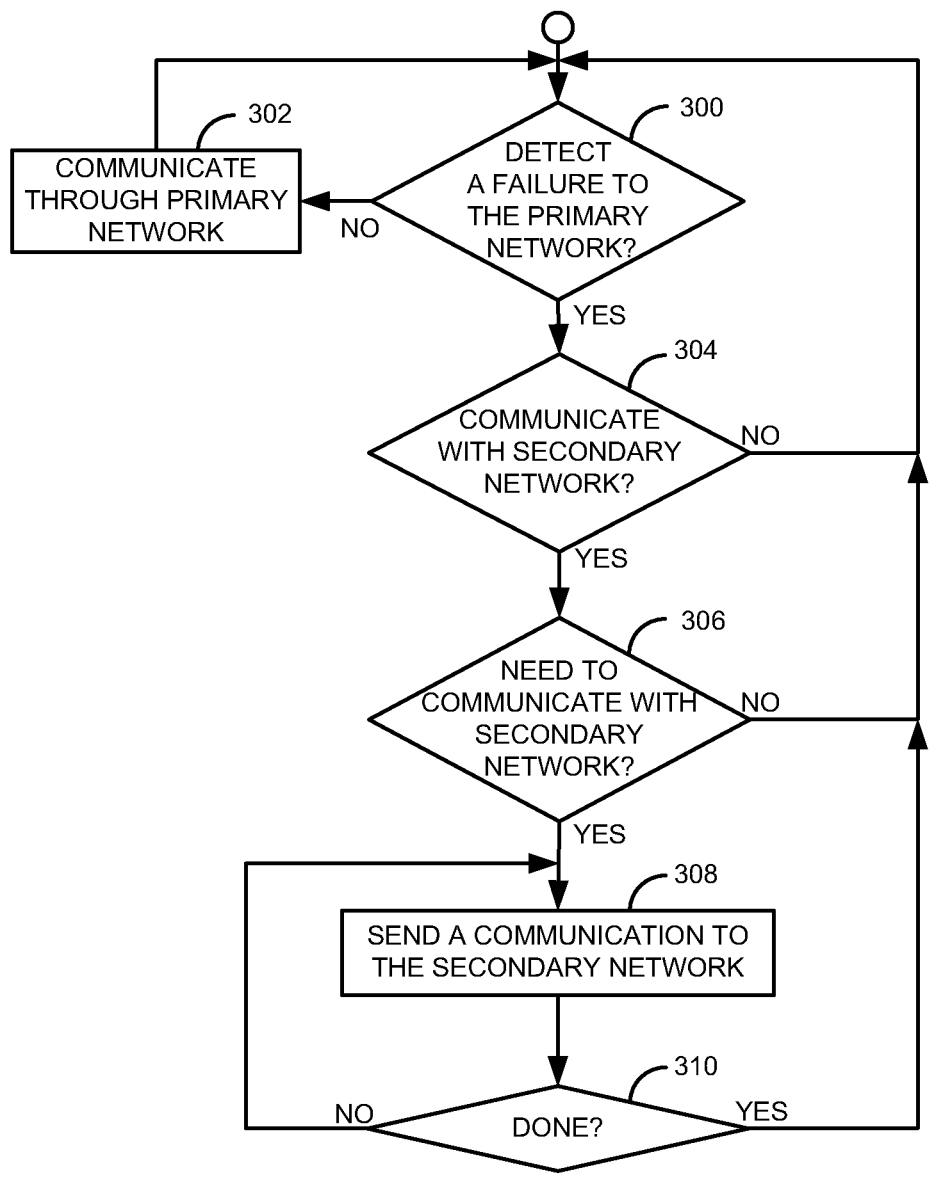
FIG. 3 is a flow diagram of a method for detecting in a communication device, a failure on a communication channel of a primary network and sending communications to a secondary network.

FIG. 3 is a flow diagram of a method for detecting in a communication device 101, a failure on a communication channel 130 of a primary network 110 and sending communications to a secondary network 120. A communication device 101 determines in step 300 if a failure has occurred on a communication channel 130 of primary network 110. If a failure has not been detected, communication device 101 communicates 302 in a normal manner through primary network 110. The process then goes to step 300.

If a failure of a communication channel 130 is detected in step 300, communication device 101 determines in step 304 if it can communicate with secondary network 120. If communication device 101 cannot communicate with secondary network 120 in step 304, the process goes to step 300. Otherwise, if communication device 101 can communicate with secondary network 120 in step 304, communication device 101 determines in step 306 if there is a need to communicate with secondary network 120 (e.g., a user places a voice call). If there is not a need to communicate with secondary network 120 in step 306, the process goes to step 300.

Otherwise, if there is a need to communicate with secondary network 120 in step 306, communication device 101 via step 308 sends the communication to secondary network 120. Communication device 101 determines in step 310 if it is done sending communications. If communication device 101 is done sending communications in step 310, the process goes to step 300. Otherwise, if communication device 101 is not done sending communications in step 310, the process goes to step 308 to send the additional communications.

Figure 4:
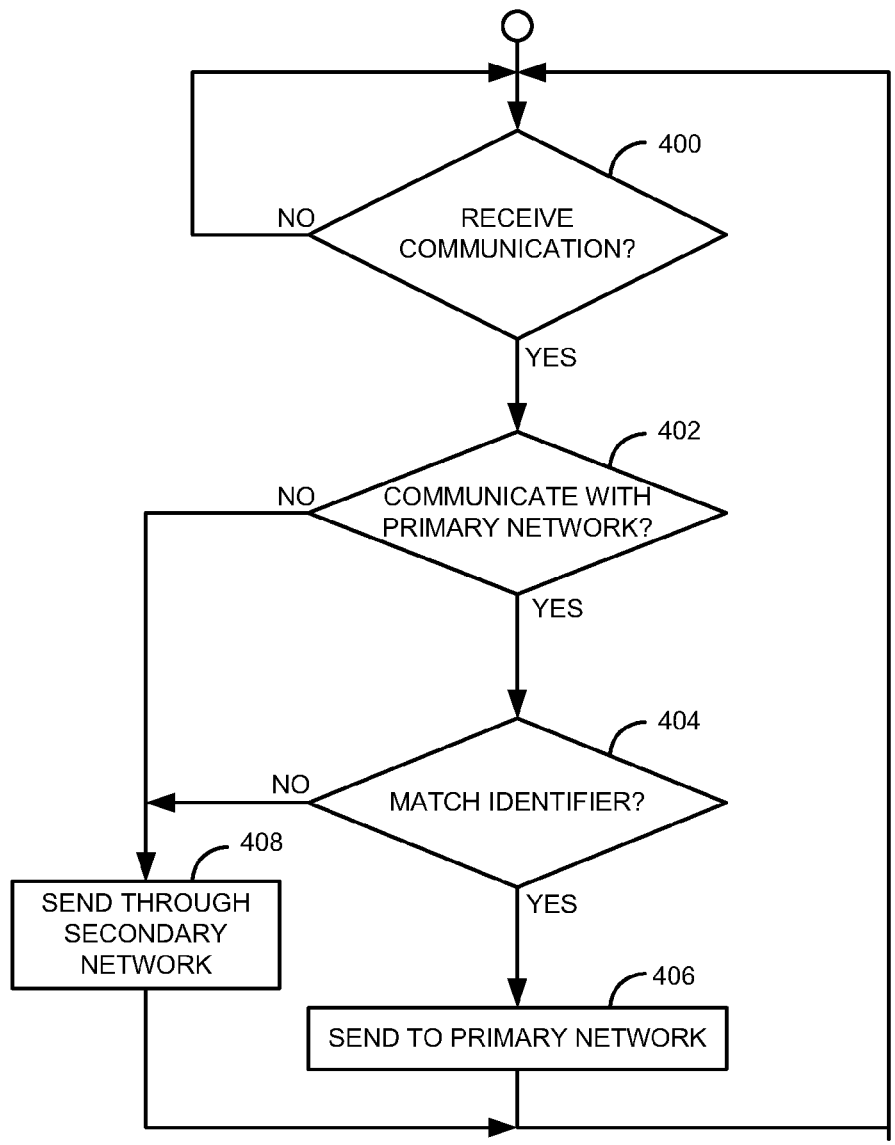
FIG. 4 is a flow diagram of a method for sending by a secondary network domain controller communications from a secondary network to a primary network via a different communication channel.

FIG. 4 is a flow diagram of a method for sending by a secondary network domain controller 121 communications from a secondary network 120 to a primary network 110 via a different communication channel 130. In describing FIG. 4, the process previously described of sending a communication from communication device 101B to communication device 101A will be used as an example.

The process begins in step 400 where secondary network domain controller 121 waits to receive a communication. If no communication is received, the process goes back to step 400. When a communication is received in step 400 (in this example from communication device 101B), secondary network domain controller 121 determines in step 402 if it can communicate with primary network 110 via communication channel 130C (or other communication channel 130 between primary network 110 and secondary network 120). If secondary network domain controller 121 cannot communicate with primary network 110 in step 402, secondary network domain controller 121, via step 408, sends the communication to communication device 101A through secondary network 120 via communication channel 130B. This way, the user can still have access (via secondary network 120) to some or all of the same services that are provided in primary network. 110. For example, the user can have access to voice communications and/or video communications provided by secondary network 120 when there is no access to primary network 110.

Otherwise, if secondary network domain controller 121 can communicate with primary network 110 in step 402, secondary network domain controller 121 determines in step 404 if the communication has an identifier of communication device 101B. Secondary network domain controller 121 can be administered to identify not only communication device 101B, but can also identify communications from any one of and/or all of communication devices 101A-101D. This can be done based on an identifier of communication device 101B, such as an IP address, a device address, a telephone number, an email address, or any address that can identify or is associated with communication device 101B and/or a user of communication device 101B.

If there is a match of an identifier in step 404, secondary network domain controller 121 via step 406 sends the communication to primary network 110 and the process goes to step 400. Otherwise, if there is not a match of the identifier in step 404, secondary network domain controller 121 via step 408, sends the communication through secondary network 120 and the process goes to step 400.

Figure 5:
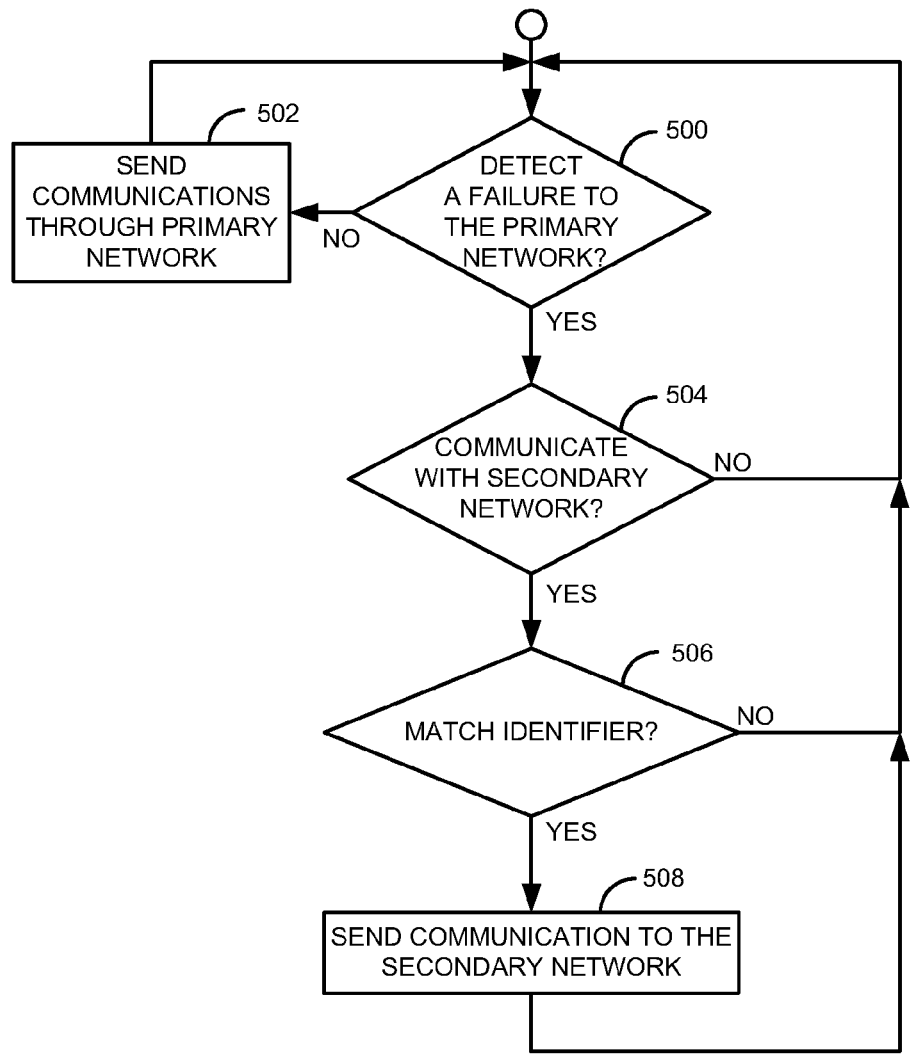
FIG. 5 is a flow diagram of a method for sending communications by a primary network domain controller from a primary network to a secondary network via a different communication channel based on a failure in a communication channel.

FIG. 5 is a flow diagram of a method for sending communications by a primary network domain controller 111 from a primary network 110 to a secondary network 120 via a different communication channel 130 based on a failure in a communication channel 130. The process begins when primary network domain controller 111 detects in step 500 a failure to a communication channel 130D of primary network 110. If there is no failure to communication channel 130D of primary network 110 in step 500, primary network domain controller 111 sends communications through primary network 110 in step 502 and the process goes back to step 500.

If primary network domain controller 111 detects a failure to a communication channel 130D of primary network 110 in step 500, primary network domain controller 111 determines in step 504 if it can communicate with secondary network 120. If primary network domain controller 111 cannot communicate with secondary network 120 in step 504, the process goes to step 500. Otherwise, if primary network domain controller 111 can communicate with secondary network 120 in step 504, primary network domain controller 111 determines in step 506 whether to send a communication to secondary network 120 based on matching an identifier in the communication. If an identifier is not matched in the communication in step 506, the process goes to step 500. Otherwise, if an identifier is matched in step 506, primary network domain controller 111 via step 508 sends the communication to secondary network 120. The communication is then sent to the appropriate communication device 101 via secondary network 120.

Figure 6:
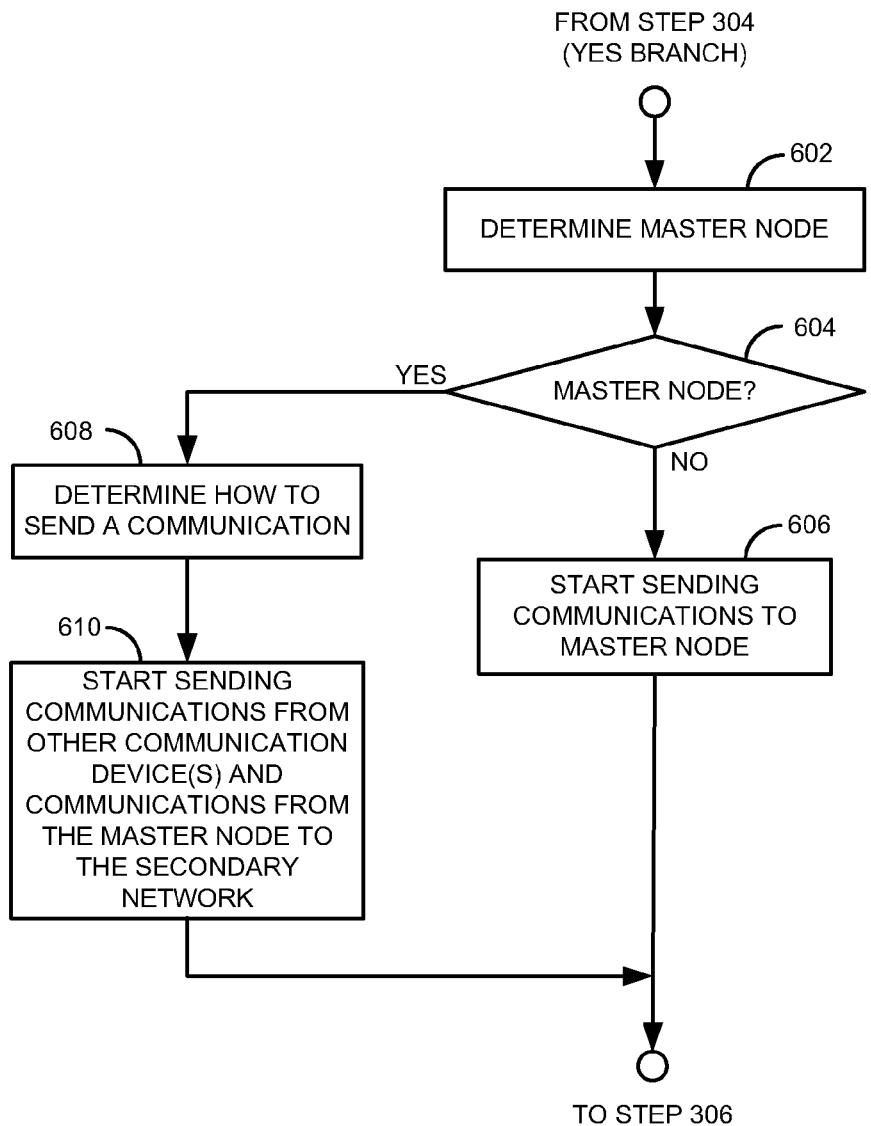
FIG. 6 is a flow diagram of a method for identifying a master node based on a failure of a communication channel.

FIG. 6 is a flow diagram of a method for identifying a master node based on a failure of communication channel 130. FIG. 6 is an optional step that can be inserted between step 304 (yes branch) and step 306. After detecting a failure in step 300 and determining in step 302 that a communication can be sent to secondary network 120 in step 304, communication devices 101B-101D at location 102 determine via step 602 a master node. The master node is a communication device 101 that will send all communications to secondary network 120 from all communication devices 101B-101D at location 102. Determining a master node can be done in a variety of ways. For example, a master node can be determined based on an address of one of communication devices 101B-101D, by having a software client that can communicate with secondary network 120, by the processing power of each of communication devices 101B-101D, by the load of communication devices 101B-101D, based on a user defined master node, and/or any method that can select a communication device 101B-101D to be a master node.

If a communication device 101 is not the master node (based on the determination in step 602) in step 604, communication device 101 starts sending in step 606, communications to the master node, and the process goes to step 306. Otherwise, if a communication device 101 has been determined to be the master node, the master node determines in step 608 how to send a communication to secondary network 120. There are a variety of ways that the master node can send a communication. This can vary based on the types of protocols supported by primary network 110 and secondary network 120. For example, the master node could send the communication by using protocols at layers 1-3 (i.e., of the Open System Interconnect 7 layer model) using protocols supported by secondary network 120. The payload of the communication could include a tunneled protocol (using protocols supported by primary network 110) that can be used by primary network 110 when the communication is sent in primary network 110 (i.e., primary network domain controller 111 could strip off the header for secondary network 120). The master node starts sending in step 610 the communications from other communication nodes at location 102 to secondary network 120 and also starts sending communications from the master node to secondary network 120.

Herein, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Herein, the term "a," "an," or another entity refers to one or more of that entity. As such, the terms "a" (or "an"), "one or more" and "at least one" can be used interchangeably herein. It is also to be noted that the terms "comprising," "including," and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
    a. detecting in a first communication device, comprising a plurality of communication devices, a failure on a first communication channel of a primary network;
    b. sending from the first communication device a communication directed to a second communication device, wherein the communication is sent to a secondary network;
    c. sending in a secondary domain controller the communication to the primary network via a second communication channel, wherein the second communication channel is between the primary network and the secondary network;

d. sending in a primary network domain controller the communication to the second communication device;

e. arbitrating in the plurality of communication devices to determine a master node of the plurality of communication devices; and f. sending in the master node of the plurality of communication devices the communication directed to the second communication device.

2. The method of claim 1, wherein the primary network is a network centric network and the secondary network is a peer-to-peer network.

3. The method of claim 2, wherein the primary network is provided by a first service provider and the secondary network is provided by a second service provider.

4. The method of claim 1, wherein sending in the secondary domain controller the communication to the primary network via the second communication channel further comprises: sending the communication to the primary network based on matching an identifier in the communication, wherein the identifier identifies at least one of the following: the first communication device, a master node, a user of the first communication device, or a user of the master node.

5. The method of claim 4, wherein sending in the secondary network domain controller the communication to the primary network via the second communication channel further comprises: sending the communication to the primary network based on a determination that the secondary network domain controller can communicate with the primary network.

6. The method of claim 4, in response to not matching the identifier in the communication, or determining that the secondary network domain controller cannot communicate with the primary network, sending the communication to the second communication device via the secondary network.

7. The method of claim 6, in response to determining that the secondary network domain controller cannot communicate with the primary network, providing a service in the secondary network that was provided by the primary network.

8. The method of claim 1, wherein sending the communication to the primary network allows a user to have access to a feature not provided on the secondary network.

9. The method of claim 1, wherein detecting the failure on the first communication channel of the primary network is accomplished by sending a different communication to the primary network.

10. The method of claim 1, wherein the communication between the first communication device and the second communication device is based on at least one of the following protocols: a connection oriented protocol, a connectionless oriented protocol, and a datagram protocol.

11. A method comprising:
a. detecting in a primary network domain controller a failure on a first communication channel of a primary network;
b. sending from a first communication device, comprising a plurality of communication devices, a communication directed to a second communication device, wherein the communication is sent to the primary network on a second communication channel;
c. sending in the primary network domain controller, the communication directed to the second communication device via a third communication channel, wherein the third communication channel is between the primary network and a secondary network;
d. sending in a secondary domain controller the communication to the second communication device;
e. arbitrating in the plurality of communication devices to determine a master node of the plurality of communication devices; and
f. sending in the master node of the plurality of communication devices the communication directed to the second communication device.

12. A system comprising:
a. a first communication device configured to detect a failure on a first communication channel of a primary network and send from a communication directed to a second communication device, wherein the communication is sent to a secondary network;
b. a secondary domain controller configured to send the communication to the primary network via a second communication channel, wherein the second communication channel is between the primary network and the secondary network, and to send the communication to the primary network based on matching an identifier in the communication, wherein the identifier identifies at least one of the following: the first communication device, a master node, a user of the first communication device, or a user of the master node; and
c. a primary network domain controller configured to send the communication to the second communication device.

13. The system of claim 12, wherein the primary network is a network centric network and the secondary network is a peer-to-peer network.

14. The system of claim 13, wherein the primary network is provided by a first service provider and the secondary network is provided by a second service provider.

15. The system of claim 12, wherein the first communication device comprises a plurality of communication devices, the plurality of communication devices are configured to arbitrate to determine a master node of the plurality of communication devices, and the master node is configured to send the communication directed to the second communication device.

16. The system of claim 12, wherein the secondary network domain controller is further configured to send the communication to the primary network based on a determination that the secondary network domain controller can communicate with the primary network.

17. The system of claim 12, in response to not matching the identifier in the communication, or determining that the secondary network domain controller cannot communicate with the primary network, sending the communication to the second communication device via the secondary network.

18. The system of claim 17, in response to determining that the secondary network domain controller cannot communicate with the primary network, providing a service in the secondary network that was provided by the primary network.

19. The system of claim 12, wherein sending the communication to the primary network allows a user to have access to a feature not provided on the secondary network.

20. The system of claim 12, wherein the first communication device is further configured to detect the failure on the first communication channel of the primary network by sending a different communication to the primary network.

21. The system of claim 12, wherein the communication between the first communication device and the second communication device is based on at least one of the following protocols: a connection oriented protocol, a connectionless oriented protocol, and a datagram protocol.

22. A system comprising:
a. a primary network domain controller configured to detect a failure on a first communication channel of a primary network and send a communication directed to a second communication device via a third communication channel, wherein the third communication channel is between the primary network and a secondary network;
b. a first communication device, comprising a plurality of communication devices, configured to send the communication directed to the second communication device, wherein the communication is sent to the primary network on a second communication channel;
c. a secondary domain controller configured to send the communication to the second communication device;
d. arbitrating in the plurality of communication devices to determine a master node of the plurality of communication devices; and
e. sending in the master node of the plurality of communication devices the communication directed to the second communication device.

\* \* \* \* \*